Feb. 23, 1943.  O. THOMPSON, SR  2,312,133
CUTTING IMPLEMENT
Filed Nov. 24, 1942
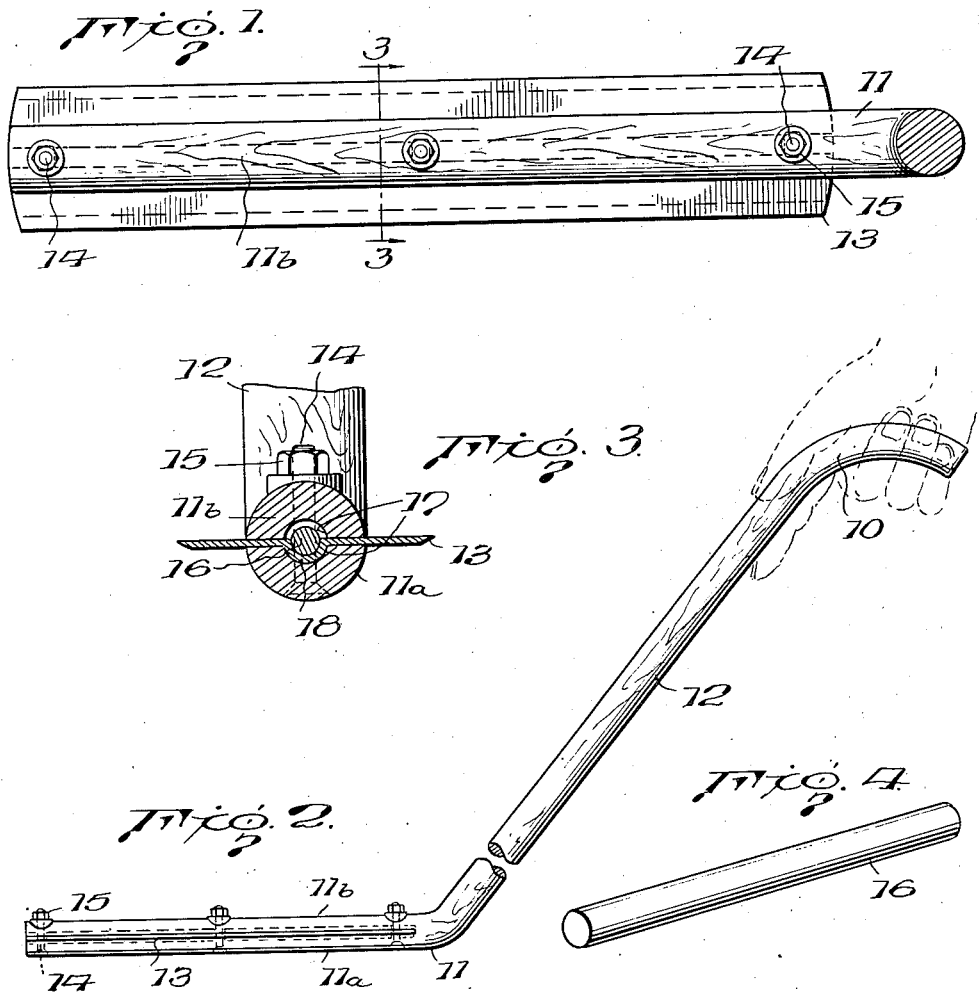
Inventor
Overton Thompson, Sr.
By Chuck & Chuck
His Attorneys Patented Feb. 23, 1943

2,312,133

UNITED STATES PATENT OFFICE 2,312,133

CUTTING IMPLEMENT

Overton Thompson, Sr., Nashville, Tenn.

Application November 24, 1942, Serial No. 466,819

6 Claims. (Cl. 30—318)

This invention relates to improvements in cutting implements.

The primary object of the invention is to provide a cutting implement, preferably provided with a double cutting edge, and hence described as being of the swinging stroke type.

Another object is to provide an implement of this type in which the cutting blade is easily removable and replaceable.

Still another object is to simplify the construction and reduce the production costs of the implement. In this connection, the entire handle and blade holding portion or base of the tool is preferably made from a single piece of wood, with the base portion divided in a horizontal plane to provide upper and lower members between which the blade is clamped. In view of the light weight of these materials, a further object of the invention is to provide a tool of such construction with proper balance.

Another object is to provide a novel arrangement for interlocking the cutting blade with the tool base which will lend to convenience in providing proper balance in the tool. More specifically, the invention contemplates the formation of mating indentations in the blade and at least one section of the blade-holding base and the use of indented portions for retaining weights or counterbalance elements in the base to provide proper balance to the tool as a whole.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a top plan view of the present implement but with the upper portion of the handle omitted;

Fig. 2 is a side elevation with the intermediate portion of the handle broken away;

Fig. 3 is a sectional view on the line 3—3 of Fig. 1;

Fig. 4 is a perspective view of a metal insert for the base of the implement.

The implement may be said to comprise three portions, i. e., the handle 10, the base 11 and the intermediate shank portion 12, and, in the construction illustrated in Figs. 1 to 4, all three of these portions are formed of a single length of wood in order to minimize production costs. Well seasoned stock should be used, and, in bending the material, the handle portion 10 is curved longitudinally, as shown, as the curvature of this portion requires the handle to be grasped with less pressure. Thus, the strain on the user's hand is minimized and, as the length of the shank 12 is such that the user does not have to stoop or bend, the implement can be used continuously over a comparatively long period of time without unduly tiring the user.

The base 11, which is bent or offset from the shank in a direction opposite that in which the handle is bent, is divided longitudinally into lower and upper sections 11a, 11b, respectively, by a kerf or slot formed transversely of the base and extending from the outer end of the base to a point near where the base merges into the shank 12. The cutting blade 13 is held in this slot or kerf. Preferably, the two halves or sections 11a, 11b remain integral with the shank portion, as such a construction will possess greater strength than if one of said sections were severed. In other words, neither section need be severed from the shank to form a removable clamping plate because the flexibility of said sections is such that the cutting blade can be firmly and securely clamped between the two sections by one or more bolts 14 extending therethrough with a threaded, exposed end for reception of co-operating nuts 15.

Preferably, the length of wood from which the implement is formed is round in cross-section, as indicated in Fig. 3. This tends to prevent injury to the base by hitting objects on the ground. It will be appreciated that the all-wood construction will result in the implement being of comparatively light weight. For this reason, it is proposed to increase the weight of the base and thus lend better balance to the tool, so it can be swung back and forth more readily. Preferably, this additional weight takes the form of metal inserts 16, such as shown in Fig. 4.

In order to securely retain the blade 13 against lateral movement in the base of the tool, the surface of one or both of the base sections is formed with a longitudinal recess or groove in which a ridge or offset portion of the blade is seated. In the present instance, both the upper and bottom sections of the base are provided with mating grooves 17 and the blade is indented to form a longitudinal rib 18 which mates with and seats in the groove in one of said sections. This particular formation not only aids in preventing lateral displacement of the blade, but it also provides space in the base for accommodation of one or more of the metal inserts 16. While both sections of the base are shown provided with a groove 17, it is possible to omit the groove in one section if it is desired to use weights of small cross-section. Preferably, the grooves 17 and the indentation for rib 18 are semi-circular in cross-section, and the weights 16 are all substantially circular in cross-section and when assembled may be said to nest in one another. Preferably, a number of bolts are used in clamping the base sections together, and, as they extend through or intersect the groove 17, each weight is made of a length corresponding to the distance between each two contiguous bolts, so that the weights can be positioned between the bolts and, in this manner, held against longitudinal movement in the base. As will be apparent, the weights 16 can be slipped endwise into the groove.

It will also be apparent that the all-wood construction of the base, shank and handle, materially reduces production costs of the implement, and the provision of means for securely anchoring or retaining the weight members 16 in the base insures the implement having the desired weight and balance. It will also be appreciated that, while the tool is shown of the swinging stroke type in that a double-edged blade is used, nevertheless a blade with a single cutting edge could be used.

What I claim is:

1. In a cutting implement of the character described, a handle, a shank portion and base formed of a continuous length of wood with the base divided lengthwise into upper and lower sections, a cutting blade between said base sections, and means for clamping said sections together.

2. In a cutting implement of the type described, a single length of wood having one end portion offset in one direction and curved lengthwise to form a handle and its other end offset in the opposite direction to form a blade-retaining base, said base being divided lengthwise into upper and lower sections, at least one of said sections being integral with the intermediate portion of said length of wood, and means for clamping the two sections together.

3. In a cutting implement of the type described, a handle, a base, and an intermediate portion all formed of a single length of wood, said base being divided lengthwise into upper and lower sections with the lower section integral with said intermediate portion, means for clamping said base sections together, and a removable weight member between said sections.

4. In a cutting implement of the type described, a handle, a base, and an intermediate portion all formed of a single length of wood, said base being divided lengthwise into upper and lower sections with the lower section integral with said intermediate portion, a blade positioned between said base sections, said blade having an indented surface, a separable weight member seated in the indentation, and means for clamping said sections together with said blade and weight therebetween.

5. In a cutting implement of the type described, a handle, a base, and an intermediate portion all formed of a single length of wood, said base being divided lengthwise into upper and lower sections with the lower section integral with said intermediate portion, said sections having mating longitudinal recesses therein, a separable weight member received in said recesses, a cutting blade between said sections, and means for clamping said sections together.

6. In a cutting implement of the type described, a handle, a base, and an intermediate portion all formed of a single length of wood, said base being divided lengthwise into upper and lower sections with the lower section integral with said intermediate portion, at least one of said sections having a recess therein, a blade between said sections, said blade having a corresponding recess therein on one side and a rib on its opposite side, said rib engaging in the recess in the base, separable weights in the recess in the blade, and securing bolts extending through the base and blade, said bolts forming stops to limit longitudinal movement of said weights.

OVERTON THOMPSON, Sr.